Oct. 4, 1960
J. P. HEIL
2,954,804
THREAD PROTECTOR
Filed Feb. 10, 1958
2 Sheets-Sheet 1
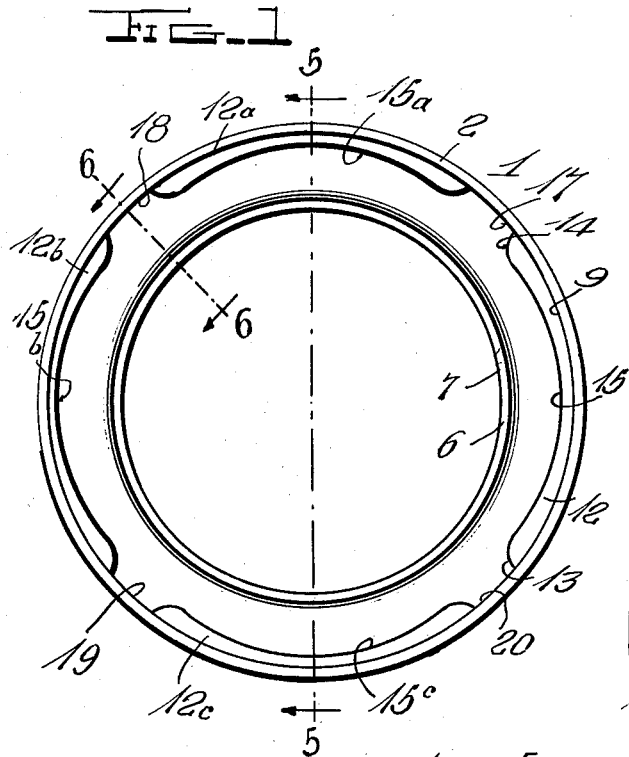
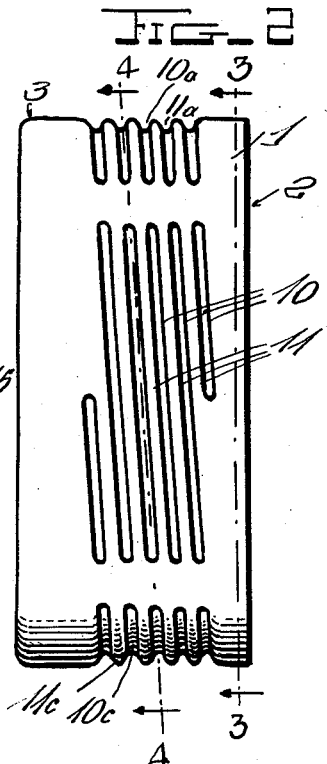
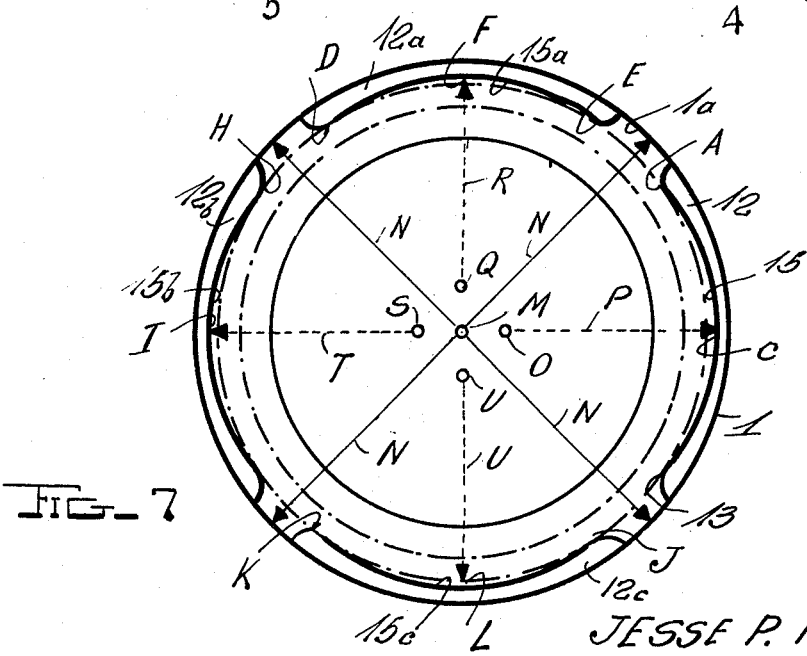
INVENTOR
JESSE P. HEIL,
BY Linton and Linton
ATTORNEYS Oct. 4, 1960 J. P. HEIL 2,954,804
THREAD PROTECTOR
Filed Feb. 10, 1958 2 Sheets-Sheet 2
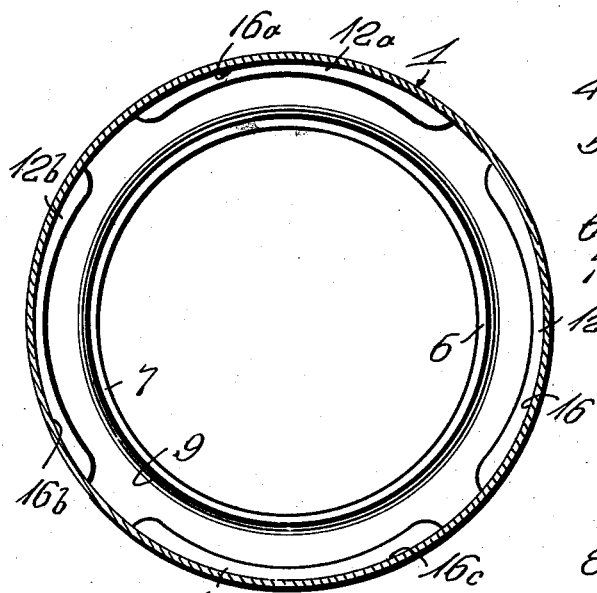
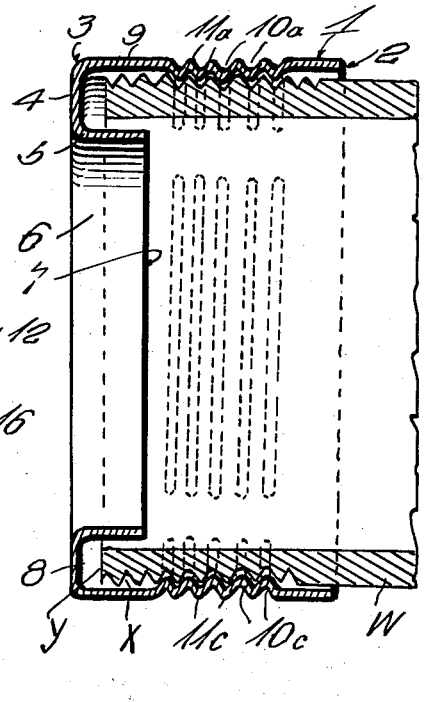
INVENTOR
JESSE P. HEIL,
BY Linton and Linton
ATTORNEYS

United States Patent Office 2,954,804
Patented Oct. 4, 1960

2,954,804
THREAD PROTECTOR

Jesse P. Heil, Rayland, Ohio, assignor to The Valley Machine Company, Inc., a corporation of West Virginia Filed Feb. 10, 1958, Ser. No. 714,294

4 Claims. (Cl. 138—96)

The present invention relates to thread protectors of the type for detachably capping the threaded end portion of various forms of tubular or cylindrical members.

The principal object of the present invention is to provide a novel thread protector including locking means to securely fasten to and protect threaded ends of pipes, tubes, conduits, rounds, shafting and the like to prevent damage to the threads during handling, storage and shipping.

A further and important object of the invention is to provide a threaded ferrule which is economically produceable from sheet metal and which protector includes interrupted helical thread sections impressed therein designed to effect releasable locking of the ferrule to the threads of pipes and the like to be protected by producing flexible distortion of the ferrule during assembly of the ferrule on the pipe.

Another and equally important object of the invention is to provide a thread protector having a plurality of interrupted internal thread teeth providing successive turns of a screw thread with the ends of each interrupted tooth extending radially of the protector a greater distance than the medial portion of the tooth to produce resilient distortion of the protector in the course of normal threading of the protector to a hand tight position on a threaded pipe to be protected to lock the protector in position by resilient stressing against accidental dislodgment.

Still further objects of the invention will be in part obvious and in part pointed out in the following detailed description of the accompanying drawings, in which, Fig. 1 is a bottom elevation of the present thread protector.

Fig. 2 is a side elevation of said thread protector.

Fig. 3 is a cross-sectional view taken on line 3—3 of Fig. 2.

Fig. 4 is a cross-sectional view taken on line 4—4 of Fig. 2.

Fig. 5 is a longitudinal section of the thread protector taken on line 5—5 of Fig. 1.

Fig. 6 is a cross-sectional view taken on line 6—6 of Fig. 1; and

Fig. 7 is a schematic view showing the principle upon which the teeth of the thread protector are formed.

Referring now more particularly to the accompanying drawing wherein like and corresponding parts are designated by similar reference characters, numeral 1 refers to the annular periphery or outer shell of a tubular ferrule formed of sheet metal of appropriate gauge having an inner edge 2 at one end thereof. The opposite end portion of said ferrule is bent as at 3 at substantially right angles providing a transverse annular end wall 4 and again at 5 at substantially right angles to said end wall providing an inner annular flange 6 within the bore of said ferrule terminating in an inner edge 7. Said flange 6 and end wall 4 thus defining an end portion of inwardly opening, substantially U-shaped cross sectional configuration providing an annular recess 8.

In the medial portion of the outer shell of the ferrule, interrupted screw threads are formed by the application of mating dies to the inside and outside surfaces of the outer shell 1, producing a helical indentation which is of the same pitch as the pitch of the threads on the product to be protected. The helical indentation is interrupted four times in one turn around the shell to produce circumferentially spaced sets of helical thread segments 12, 12a, 12b and 12c.

Each impressed thread segment 12 has rounded circumferentially spaced ends 13 and 14 and an arcuate ridge 15 joining said ends. Similarly, impressed thread segment 12a has an arcuate ridge 15a; impressed thread segment 12b an arcuate ridge 15b; and impressed thread segment 12c an arcuate ridge 15c.

Alternating with thread segments 12 are valleys 16 which are the opposite sides of ribs 11 while valleys 16a, 16b and 16c alternate with the thread segments 12a, 12b and 12c respectively.

The bore of the ferrule is defined by an inner wall 1a which is of substantially a circular configuration as will be explained hereinafter.

Inner thread segments 12, 12a, 12b and 12c form the interrupted successive turns of an internal helical screw thread with the thread segments 12 being substantially parallel to one another and spaced by a longitudinal bridge 17 of the ferrule from the thread segments 12a which are likewise substantially parallel to one another and spaced by bridge 18 of the ferrule from the thread segments 12b, also substantially parallel to one another. Said thread segments 12b are spaced by a bridge 19 of the ferrule from substantially parallel thread segments 12c spaced by bridge 20 of the ferrule from thread segment 12. Bridges 17, 18, 19 and 20 extend longitudinally of the ferrule between the thread segments as aforementioned dividing the same into the four circumferentially spaced sets of thread segments and are an integral portion of the ferrule.

The inner wall 1a of the outer shell 1 as schematically shown in Fig. 7 is based upon a radius N whose center M is at the axis of the ferrule. Ridge 15 of each thread segment 12 is of an arcuate configuration whose radius P is shorter than said radius N having its center O offset from center M with the result that the end points A and B of said thread segment extend further from wall 1a than does the medial portion C of said ridge. Similarly, impressed thread segment 12a has ridge 15a with a radius R whose center Q is offset from center M with the end portions D and E of said ridge being deeper than the medial portion F. Likewise each thread segment 12b has arcuate ridge 15b determined by the radius T whose center S is offset from center M and with the end portions G and H extending deeper into the bore of said ferrule than the center portion I. Also each thread segment 12c has ridge 15c based upon a radius V whose center U is spaced from center M and which ridge has end portions J and K extending further from inner wall 1a than the center portion L. Radii P, R, T and U are thus all shorter than radius N, but preferably of the same length as each other and with this length determined in order that the high points A, B, D, E, G, H, J and K of said thread segments are positioned for threadedly engaging with the threads of the element to be protected. Thus, the medial portions C, F, I and L will be spaced from or loosely contacting the threads to be protected for having a medium fit therewith.

It will be noted from the above description and the drawings that the threads of the protector do not contain any taper and that each helical thread segment is in the same relative position from the axis of the protector. Thus, the high points A, B, D, E, G, H, K and J are all located an equal distance from the axis of the protector. On the other hand, the threads of the pipe or other product to be protected, in accordance with conventional practice, will be standard taper threads wherein the diameter of the threads progressively increases by a substantially uniform amount per thread from a minimum diameter at the external or endmost thread. Because of this taper of the pipe threads the initial engagement of high points A, B, D, E, G, H, K and J of the protector threads with the pipe threads will be a loose engagement without noticeable friction. As the protector is progressively threaded onto the pipe threads, the engagement of the high points of the protector threads with the pipe threads becomes progressively tighter until the high points of the protector threads contact the pipe threads with sufficient friction to retain the protector in position with a normal holding force. However, since the outer shell 1 of the protector is resiliently deformable, the protector may be further advanced along the pipe threads, producing resilient distortion of the outer shell and of the arcs of the protector thread segments. In normal use, the protector will be advanced by hand along the pipe threads to a point where the medial portions C, F, I and L of the thread segments will be loosely contacting the pipe threads, at which point the resilient distortion of the arcs of the protector thread segments 12, 12a, 12b, and 12c causes a strong additional force to be applied to the pipe threads in addition to the frictional force between the protector threads and the pipe locking the protector securely to the pipe against accidental dislodgment.

In the use of the present thread protector, there is shown, for example only, a tube end portion W having peripheral helical threads X to be protected and an end Y which end portion is inserted within the bore of said ferrule and helical thread segments 12, 12a, 12b and 12c threadedly engaged and screwed onto threads X until the tube end Y enters recess 8. Since the end wall 4 of the protector is disposed to be free of contact with the end Y of the pipe, the protector remains free to be advanced along the pipe threads to the resiliently distorted condition wherein the protector is securely locked onto the pipe against accidental dislodgment. Thus the tube W is protected from foreign matter and elements striking threads X or the end Y as long as the thread protector is thereon. When the thread protector is no longer required, it can be unscrewed from the tube W and discarded or used upon other similar tube ends.

In Fig. 5 flange 6 is shown spaced from ferrule portion 9 a sufficient distance for receiving the tube end Y therebetween. However, flange 6 can be positioned closer to ferrule portion 9 so that edge 7 will contact end Y of said tube when so desired.

The present thread protector is capable of considerable modification and such changes thereto as come within the scope of the appended claims are deemed to be parts of the present invention.

What I claim is:

1. A thread protector for detachably encasing threads on the end of a threaded element comprising a tubular ferrule of sheet metal having a resiliently deformable, axially extending wall of circular cross section, said axially extending wall having a plurality of inwardly impressed helical threads conforming to the pitch of the element threads to be threadedly coupled therewith, said helical threads being interrupted at circumferentially spaced points to provide a plurality of helical thread segments, said helical thread segments each extending along arcuate paths of smaller radius than the radius of the element threads and being located diametrically of said wall to cause the helical thread segments to be resiliently bowed outwardly by interengagement with the element threads when the protector is threaded thereon to stress said segments and wall to tightly grip the element threads.

2. A thread protector for detachably encasing threads on the end of a threaded element comprising a tubular ferrule of sheet metal having a resiliently deformable, axially extending wall of circular cross section, said axially extending wall having a plurality of inwardly impressed helical threads conforming to the pitch of the element threads to be threadedly coupled therewith, said helical threads being interrupted at circumferentially spaced points to provide a plurality of helical thread segments, said helical thread segments each having an inwardly concave arcuate medial portion spaced diametrically of said axially extending wall to threadedly engage said element threads when the protector is threaded thereon and circumferentially spaced end portions extending closer than said medial portion to the axis of said wall to be resiliently deformed radially outwardly by said element threads when the protector is threaded thereon and stress said helical thread segments and wall to tightly grip the element threads.

3. A thread protector for detachably encasing threads on the end of a threaded element comprising a tubular ferrule of sheet metal having a resiliently deformable, axially extending wall of circular cross section, said axially extending wall having a plurality of inwardly impressed helical threads conforming to the pitch of the element threads to be threadedly coupled therewith, said helical threads being interrupted at circumferentially spaced points to provide a plurality of helical thread segments, said helical thread segments each having circumferentially spaced end portions and an intervening medial arcuate portion, the medial portions of said helical segments being spaced diametrically of said axially extending wall to threadedly engage the element threads when the protector is threaded thereon and said end portions extending nearer the axis of said wall than said medial portions to cause said helical thread segments to be resiliently deformed by interengagement with said element threads to a substantially arcuate path of longer radius to stress said helical thread segments and said wall and cause the same to tightly grip the threaded element.

4. In a thread protector for detachably encasing threads on the end of a threaded element, the combination recited in claim 3 wherein said ferrule is provided with a transversely extending annular end wall integral with said axially extending wall to overlie the end face of the threaded element adjacent the element threads, said transverse end wall being positioned relative to said helical thread segments to be spaced axially from the adjacent end face of the threaded element when the protector is tightly threaded thereon.

References Cited in the file of this patent
UNITED STATES PATENTS

| | | |
|---|---|---|
| 1,776,528 | Unke | Sept. 23, 1930 |
| 1,807,565 | Burnish | May 26, 1931 |